US005329562A

United States Patent [19]
Kubo et al.

[11] Patent Number: 5,329,562
[45] Date of Patent: Jul. 12, 1994

[54] METHOD OF CUTTING AND REMOVING NUCLEAR REACTOR

[75] Inventors: Setsuo Kubo, Kyoto, Japan; Edward P. Johnston, Winnipeg, Canada

[73] Assignee: Kabushiki Kaisha Dymosha, Kyoto, Japan

[21] Appl. No.: 931,363

[22] Filed: Aug. 18, 1992

[30] Foreign Application Priority Data

Aug. 26, 1991 [JP] Japan ................. 3-236857
Jan. 24, 1992 [JP] Japan ................. 4-032913

[51] Int. Cl.$^5$ ............................................. G21C 19/00
[52] U.S. Cl. ................................................. 376/260
[58] Field of Search ........... 976/DIG. 292, DIG. 293; 376/260

[56] References Cited

U.S. PATENT DOCUMENTS

| 4,648,989 | 3/1987 | Klein | 376/261 |
| 4,818,472 | 4/1989 | Operschall et al. | 376/260 |
| 5,001,870 | 3/1991 | Yokota et al. | 376/260 |

FOREIGN PATENT DOCUMENTS

| 0248286 | 5/1987 | European Pat. Off. |
| 61-93998 | 5/1986 | Japan . |
| 62-118972 | 5/1987 | Japan . |
| 62-164966 | 7/1987 | Japan . |
| 62-272199 | 11/1987 | Japan . |
| 62-285100 | 12/1987 | Japan . |
| 64-24965 | 1/1989 | Japan . |
| 64-66370 | 3/1989 | Japan . |
| 64-66372 | 3/1989 | Japan . |
| 1-92697 | 4/1989 | Japan . |
| 1-94164 | 4/1989 | Japan . |
| 1-302200 | 12/1989 | Japan . |
| 3-2597 | 1/1991 | Japan . |
| 2176924A | 6/1985 | United Kingdom . |

OTHER PUBLICATIONS

Japanese Opened Patent Publication 64-24965 (abstract).
Japanese opened Patent Publication 62-285100 (abstract).
Japanese Opened patent Publication 62-272199 (abstract).
Japanese Opened Patent Publication 62-164966 (abstract).
Japanese Opened Patent Publication 62-118972 (abstract).
Japanese opned Patent Publication 61-9398 (abstract).

(List continued on next page.)

Primary Examiner—Donald P. Walsh
Assistant Examiner—F. Voss
Attorney, Agent, or Firm—Armstrong, Westerman, Hattori, McLeLand & Naughton

[57] ABSTRACT

This invention relates to a method of cutting and removing a nuclear reactor which includes the pressure-feeding of a grouting material into a pressure vessel and to peripheral members outside the pressure vessel so as to integrate and solidify them, and the cutting of the structure starting with the outer periphery of the pressure vessel. When the cutting operation is carried out, the present invention preferably uses a wire saw having diamond grains on the surface thereof, and further performs double cutting by the use of a preceding cutting edge and a cutting groove width adjustment cutting edge when the cutting operation is made. In this way, the pressure vessel of the nuclear reactor can be dismantled and removed safely and efficiently. This invention can also include the packing of a cement grouting material or a synthetic resin material into the reactor, covering the outer periphery of the reactor with a concrete, cutting the reactor into blocks starting with its outer peripheral portion with a wire saw using diamond beads and carrying out the blocks, and also the packing of a cement grouting material or a synthetic resin material into the reactor, plasma-cutting the outer portion of the reactor, then cutting the inside of the reactor into blocks with a wire saw using diamond beads, and carrying out the blocks, in order to cut and remove the nuclear reactor. Advantages of this invention include the cutting of the reactor in a stable manner, and the reduction of the wear of the wire saw grains.

6 Claims, 8 Drawing Sheets

OTHER PUBLICATIONS

Japanese Opened Patent Publication 61-94164 (abstract).

Japanese Opened Patent Publication 1-92697 (abstract).

Japanese Opened Patent Publication 64-66372 (abstract).

Japanese Opened Patent Publication 64-66370 (abstract).

Japanese Opened Patent Publication 3-2597 (abstract).

Japanese Opened Patent Publication 1-302200 (abstract).

European Patent Publication 248286 (abstract).

"When a Nuclear Reactor Dies, $98. Million is a Cheap Funeral", by Seth Shulman, Smithsonian Magazine, Oct./Nov. 89, pp. 54-64 67-69.

Trentec Diamond Wire Concrete Cutting, brochure, Jan. 91.

METHOD OF CUTTING AND REMOVING NUCLEAR REACTOR

BACKGROUND OF THE INVENTION

1. Field of the Invention

This invention relates to a method of cutting and removing a nuclear reactor for dismantling and removing a used nuclear reactor.

2. Description of the Prior Art

Generally, nuclear reactors reach a permanent operation termination period 30 to 40 years after the start of the operation. Even after a nuclear fuel is withdrawn, a nuclear reactor has residual radioactivity such as radioactivation products, and various regulations have been put in force to ensure safety management and disposal for decommissioning of such a nuclear reactor.

Means for decommissioning a nuclear reactor comes in three types. First means closes a nuclear reactor facility and puts it under suitable management, second means executes work such as shielding of the nuclear reactor to tightly isolate radioactive materials form outside and third means dismantles and removes radioactive structures inside the reactor facility.

Since only a limited environment for installation of the nuclear reactor is available, a new facility, too, is preferably set up inside the same facility as the existing facility and in this sense, the third means for dismantling and removing the used reactor is preferred among the means described above. Accordingly, the development of a method of dismantling and removing safely and efficiently the used reactor has been earnestly desired.

As means for accomplishing the object described above, a method has been proposed which cuts vertically and horizontally the body base portion of the reactor, for example, by continuous core boring so as to cut off the base portion from a pressure vessel, and transports and preserves them under a sealed state in a large waste preservation warehouse.

SUMMARY OF THE INVENTION

The pressure vessel itself of the reactor, after the body base portion thereof has been removed, has a diameter of 5 to 8 m and a height of 12 to 18 m. The wall thickness of the pressure vessel made of an austenitic stainless steel is from about 150 to 200 mm. Since no method which divides the pressure vessel, being a large-scale facility, both horizontally and vertically has not yet been established, the pressure vessel has been preserved in the past in a large-scale sealed preservation warehouse.

A technique which cuts such a pressure vessel in water by a remote-controlled plasma cutting method is now being developed but cutting of the structure inside the reactor by this method is extremely difficult, though this method can cut the pressure vessel and the outer peripheral portions.

Nevertheless, the number of nuclear reactors the service life of which ends up shortly are acceleratingly increasing every year and hence, the development of a method which can dismantle and remove safely and efficiently the nuclear reactors has been strongly desired.

As its dismantling technique, the Applicant of the present invention has developed a technique which pressure-feeds grouting material into a pressure vessel to integrally solidify them together, and then cuts them with a wire saw having diamond grains.

When the pressure vessel is cut starting with its outer periphery, the technique described above can cut integrally all the structural members while preventing the scatter of radioactive appliances and base materials and can therefore carry out safely and reliably the dismantling operation. Moreover, since the grouting material isolates the internal materials having radioactivity, transportation and disposal can be carried out safely.

In the technique described above, the outer periphery of the surface to be cut is made of a metal. Therefore, the development of a technique which can stabilize the initial cutting portion and can decrease wear of the grains of the wire saw during the cutting operation of the metal portions has been desired as a technique which further improves cutting efficiency.

It is therefore a first object of the present invention to provide a method of safely and efficiently dismantling and removing a nuclear reactor, particularly its pressure vessel.

It is a second object of the present invention to provide a method of cutting and removing a nuclear reactor which can stably cut the reactor when the reactor is cut with a wire saw, and can reduce the wear of the grains of the wire saw.

To accomplish the first object, the method of cutting and removing the nuclear reactor according to the present invention pressure-feeds a grouting material into the pressure vessel and into peripheral members outside the pressure vessel so as to integrally solidify them together, and starts cutting with the outer periphery of the pressure vessel. When the cutting operation is carried out, the method of the invention uses a wire saw having diamond grains on the surface. Furthermore, when the cutting operation is carried out, the present invention executes double cutting by the use of a preceding cutting edge and a cutting groove width adjustment cutting edge, and in this way, the present invention can dismantle and remove safely and efficiently the pressure vessel, and the like, of the nuclear reactor.

To accomplish the second object, the second means of the present invention comprises packing a cement grouting material or a synthetic resin material into the nuclear reactor, covering its outer periphery with a concrete, cutting the reactor into blocks starting with its outer periphery with a wire saw using diamond beads and carrying them out, and comprises packing a cement grouting material or a synthetic resin material into a nuclear reactor, cutting the outer portion of the reactor by a plasma, cutting then the inside of the reactor into blocks with a wire saw using diamond beads, and carrying them out, in order to cut and remove the nuclear reactor. When the nuclear reactor is cut with the wire saw, therefore, the present invention can stably cut the reactor, can reduce the wear of the grains of the wire saw and can improve cutting performance.

A first means being constituted as described above, the present invention first pressure-feeds a grouting material into the pressure vessel and into the peripheral members outside the pressure vessel so as to integrate and solidify them together, then prevents radioactive appliances and materials from scattering when the cutting operation is started with the outer periphery of the pressure vessel, and makes it possible to carry out smoothly the cutting operation by using a wire saw, or the like. The present invention uses a wire saw having diamond grains on the surface and cuts integrally all the appliances and materials, conducts double cutting using a preceding cutting edge and a cutting width adjustment cutting edge, and keeps a predetermined cutting width by the cutting width adjustment cutting edge which compensates for a decrease in cutting groove width resulting from the wear of the preceding cutting edge.

The second means being constituted as described above, the present invention first pressure-feeds a cement grouting material or synthetic resin material having high fluidity into the nuclear reactor before cutting of the reactor is started, and the cement grouting material or the synthetic resin material is packed even into fine spaces of internal appliances. Next, after the outer periphery of the reactor is covered with concrete, it is cut with the wire saw using the diamond beads. In this case, since the first cut portion is the concrete material, the cutting operation can be easily started with the wire saw using the diamond beads and when the cutting operation reaches the main body of the reactor made of a stainless steel, the wire saw can exhibit a stable cutting performance as it is guided by the cut concrete portion. Even when the sharpness of the cutting portion of the wire saw drops due to the wear of the surface of the bead material in the course of cutting of the stainless steel reactor, the concrete material which is cut from the metal portion by the wire saw functions as the grinding stone and polishes the wire saw. Therefore, the wire saw maintains its performance in cutting the stainless steel.

DESCRIPTION OF THE PREFERRED EMBODIMENT

Hereinafter, an embodiment for accomplishing the first means of the present invention will be explained with reference to the accompanying drawings.

Figure 1:
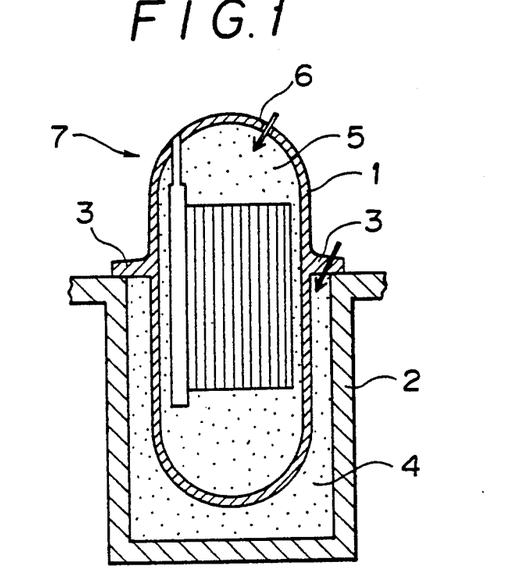
FIG. 1 is a sectional view showing the state where a grouting material is packed into a structure inside a reactor in an embodiment for accomplishing the first object of the present invention.

As shown in FIG. 1, a pressure vessel 1 inside a reactor is supported at its jaw 3 by a concrete base 2. When this pressure vessel 2 is to be dismantled, a grouting material 4 is pressure-fed via an opening bored in the jaw 3 or between the jaw 3 and the concrete base 2.

The grouting material uses cement and a mortar paste as a base material and contains a suitable amount of admixtures for making a packing operation smooth and for improving fluidity. A grouting material of a non-shrinkable type is used. Besides the grouting material, a synthetic resin such as an epoxy resin and a suitable material such as cement can be used as materials for fixing installation, pipings, etc, inside the reactor.

An opening 6 is also bored in the upper part of the pressure vessel 1 and a similar grouting material 5 is packed through this opening 6. As a result, the inside and outer periphery of the pressure vessel and the inside of the concrete base, inclusive of various instruments such as the pipings, are all integrated and solidified after the solidification of the grouting material.

When the grouting material 5 is packed, a vibrator may be used so that the grouting material 5 can be reliably packed even into narrow spaces of the pressure vessel 1.

Figure 2:
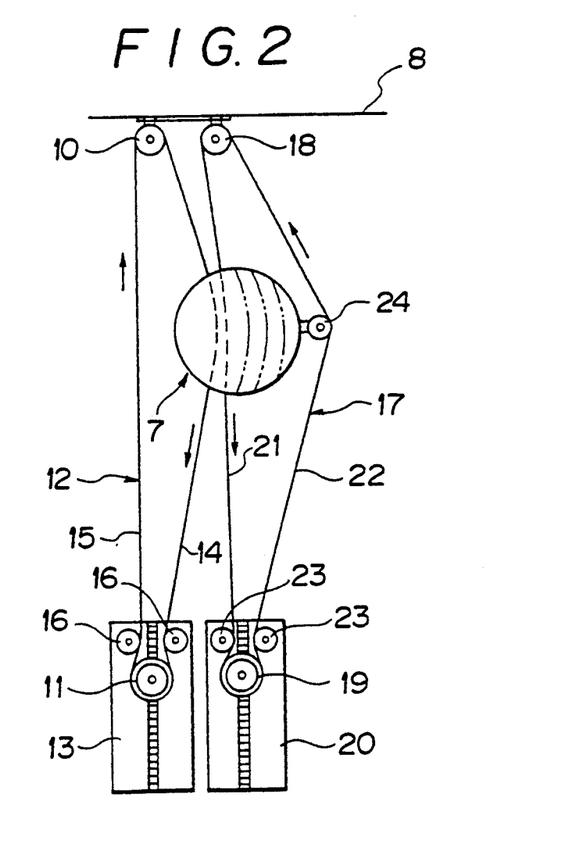
FIG. 2 is a plan view showing a horizontal cut state in the above embodiment of the present invention.
Figure 3:
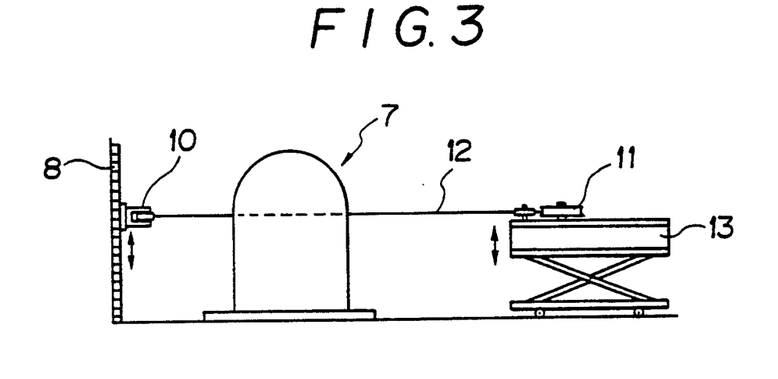
FIG. 3 is a front view showing a horizontal cut state in the above embodiment of the present invention.

To horizontally cut the structure 7 inside the reactor which is thus integrated by the grouting material, a first endless wire saw 12 is passed around a first guide pulley 10 and a first driving pulley 11 which are fixed to a wall 8 so that their vertical positions can be freely adjusted, as shown in FIGS. 2 and 3. The first driving pulley 11 is fixed to a first driving device 13 which is equipped therein with a driving motor, and the height of this first driving device 13 is adjustable.

The first driving pulley 11 is fixed to the first driving device 13 in such a manner as to be movable in a direction of the structure to be cut, and when its fixing position is adjusted, the tension of the first wire saw 12 can be kept substantially constant. A pull side 14 of the first wire saw 12 is hooked to the structure 7 inside the reactor and its feed side 15 is directly set over the first guide pulley 10 through guide rollers 16, 16.

A second wire saw 17 is disposed at the back with respect to the cutting direction of the first wire saw 12 and is passed around a second guide pulley 18 and a second driving pulley 19. The second driving pulley 19 is fixed to a second driving device 20 equipped therein with a driving motor and the height of this second driving device 20 is adjustable. The second driving pulley 19 is fixed to the second driving device 20 in such a manner as to be capable of moving in the direction of the structure to be cut, and the tension of the second wire saw 17 can be kept substantially constant. A pull side 21 of the second wire saw 17 is put into a cutting groove formed by the first wire saw in the structure 7 inside the reactor, and its feed side 22 is directly set over the second guide pulley 17 through guide rollers 23, 23 that are fixed to the structure inside the reactor.

According to the construction described above, the structure 7 inside the reactor is gradually cut integrally with the metal members, concrete members and the grouting material which is packed, by the pull side 14 of the first wire saw 17.

In order to integrally cut the concrete materials, inclusive of the austenitic stainless steel, constituting the pressure vessel, it is suitable to use, as the wire saw, a diamond sintered cutting edge obtained by connecting beads formed by sintering diamond grains with powder of cobalt, bronze, etc, a diamond electrodeposition cutting edge obtained by connecting beads formed by electro-depositing diamond onto an alloy of steel in a nickel solution, or a wire-like wire saw obtained by electrodeposition diamond grains to a steel wire.

Among them, the diamond electrodeposition cutting edge and the wire-like wire saw involve the problem that since the diamond layer exists only on the surface of the alloy, the wire saw must be replaced by another as soon as the diamond layer on the surface is worn out, and hence, the replacement of the wire saw must be carried out very frequently.

If the diamond sintered cutting edge is used, in contrast, a new cutting edge appears one after another as the surface is worn out, so that cuttability is high and the frequency of the replacement of the wire saw drops. However, when the diamond sintered cutting edge is used, the diameter of the wire saw becomes smaller due to the wear at the time of cutting and when the wire saw must be replaced in the middle of cutting, a new wire saw having an initial diameter cannot be fitted easily into the cutting portion. Therefore, cutting is effected by the second wire saw 17 immediately after cutting by the first wire saw 12, as shown in FIG. 2.

Figure 4:
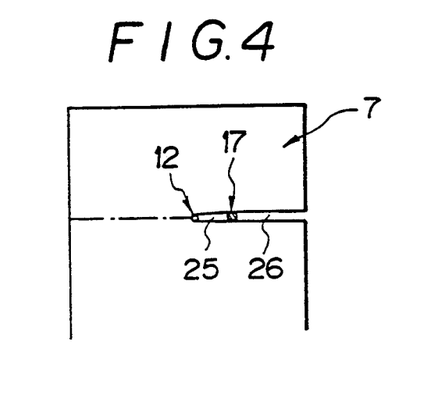
FIG. 4 is a sectional view showing the cut state at the time of horizontal cutting in the above embodiment of the present invention.

As a result, the first wire saw 12 as a preceding cutting edge forms the cutting groove 25 and the second wire saw 17 defines a cutting width adjustment portion 26 as shown in FIG. 4 so that a new wire saw having the initial diameter can be fitted into the cutting groove by the cutting width adjustment portion 26.

Accordingly, when the first wire saw 12 as the preceding cutting edge is worn out, the second wire saw 17 plays the role of the receding first wire and forms a new cutting edge, and the new wire saw inserted at the back of the second wire saw 17 functions as the second wire saw for the cutting width adjustment.

In this way, the reactor structure is cut horizontally and when this cutting is carried out starting with the upper part of the structure inside the reactor with predetermined intervals, the structure inside the reactor is finely cut in the horizontal direction.

Figure 5:
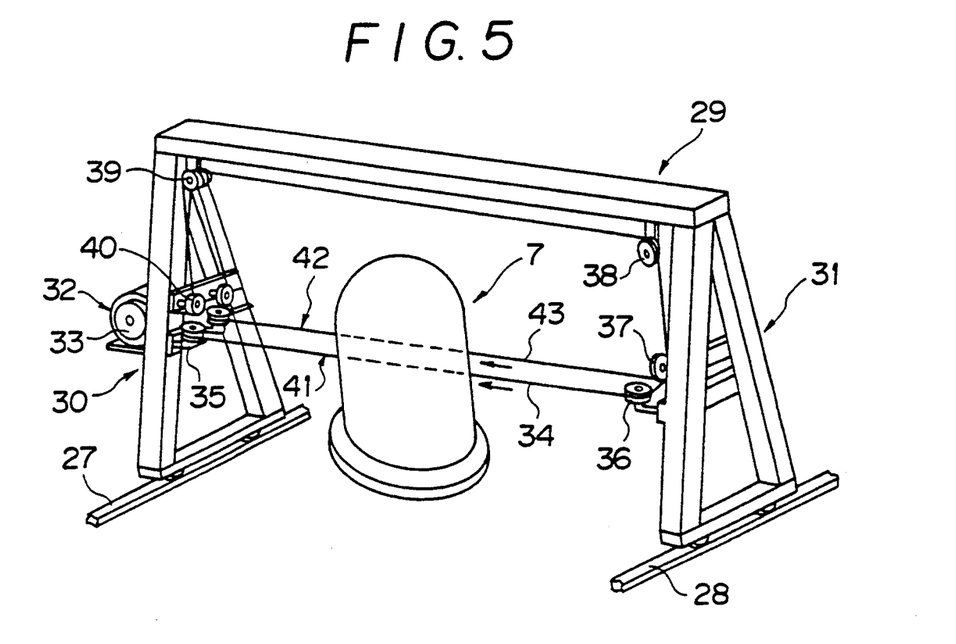
FIG. 5 is a perspective view showing horizontal cutting in another embodiment of the present invention.

As a horizontal cutting apparatus for the structure of the reactor, a truck 29 that runs on right and left rails 27, 28 as shown in FIG. 5, for example, can also be used. A driving motor 32 is fixed to a first frame 30 of this truck 29, and a first wire saw 34 set over a driving pulley 33 of the driving motor 32 is then passed sequentially around guide pullies 35, 36, 37, 38, 39, 40 that are supported by the truck 29, so as to constitute a first wire saw driving portion 41.

A second wire saw driving portion 42 having a construction similar to that of the first wire saw driving portion 41 is disposed immediately at the back of the first wire saw driving portion 41. The first wire saw 34 is used as the preceding cutting edge and the second wire saw 43, as the cutting width adjustment cutting edge.

Figure 6:
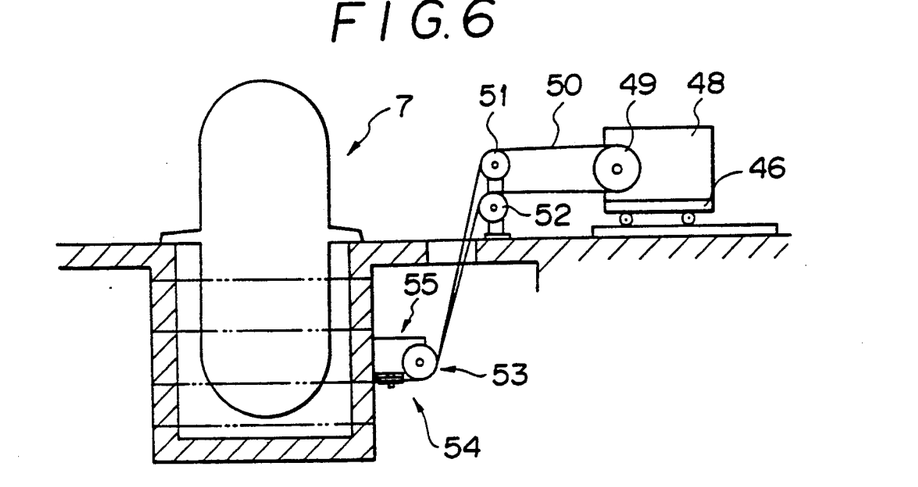
FIG. 6 is a side view showing horizontal cutting in still another embodiment of the present invention.

When the horizontal plane of the wire saw driving device and the cutting horizontal plane are different, a driving device 48 supporting the driving pulley 47 is disposed on the truck 46 on the foundation surface 45 as shown in FIG. 6, the wire saw 50 set over the driving pulley 47 is guided to the cutting horizontal direction by the guide pullies 51, 52, and the wire saw 50 is disposed to be driven inside the horizontal plane by the vertical pulley 53 and horizontal guide pulley 54 that are fixed to the structure 7 inside the reactor. The truck 46 moves back in such a manner as to keep a predetermined tension in accordance with the cutting condition. Cutting on an arbitrary horizontal plane becomes possible by fixing a guide pulley unit 55 comprising the vertical guide pulley 53 and the horizontal guide pulley 54 described above onto an arbitrary horizontal plane.

Figure 7:
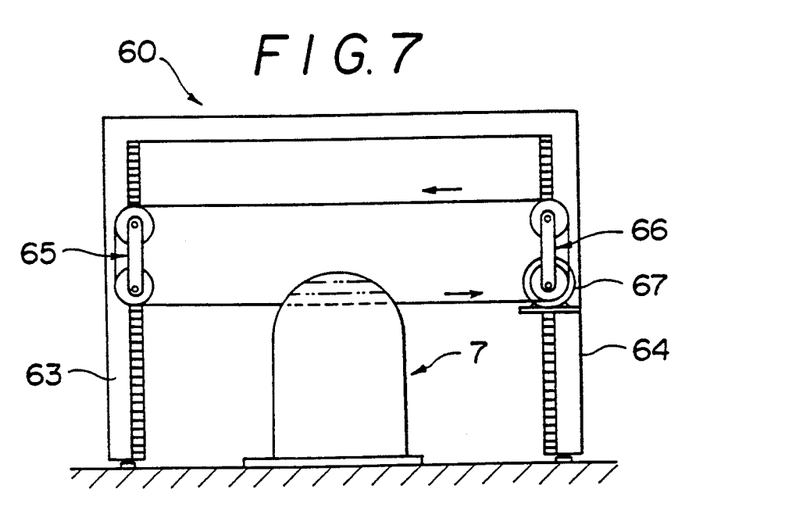
FIG. 7 is a front view showing a vertical cut state by the first means of the present invention.

When the structure inside the reactor is cut vertically, on the other hand, a gate-shaped frame 60 is disposed movably on rails 61, 62 in such a manner as to encompass the structure 7 inside the reactor as shown in FIG. 7. The wire saws are passed around pullies 65, 66 of pulley units 65, 66 that are disposed on support poles 63, 64 of the gate-shaped frame 60 in such a manner as to be movable in the vertical direction, and while the wire saw 68 is being driven by a motor 67, cutting is carried out in the vertical direction by lowering the pulley units 65, 66 in accordance with the cutting condition.

Figure 8:
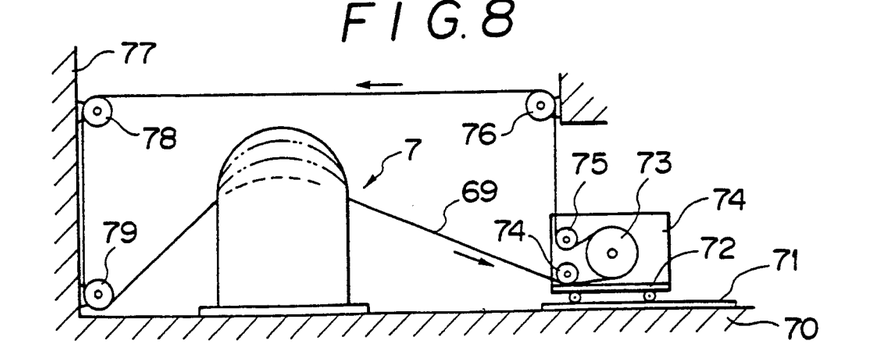
FIG. 8 is a front view showing another embodiment of vertical cutting in the present invention.

Cutting in the vertical direction can be made by the use of the following arrangement. A driving pulley 73 is supported on a truck 72 disposed movably on a rail 71 of a base 70 as shown in FIG. 8, and a driving device 74 equipped therein with a motor is provided. Then, the wire saw 69 set over the driving pulley 73 is passed around guide pullies 78, 79 disposed at upper and lower portions of a wall 77 through the guide pullies 75, 75, 76.

When the wire saw 69 is placed over the top of the structure 7 inside the reactor and is driven, the structure 7 inside the reactor is cut in the vertical direction and when the truck 72 is moved back in accordance with this cutting operation, the wire saw can make cutting always with a predetermined tension.

Figure 9:
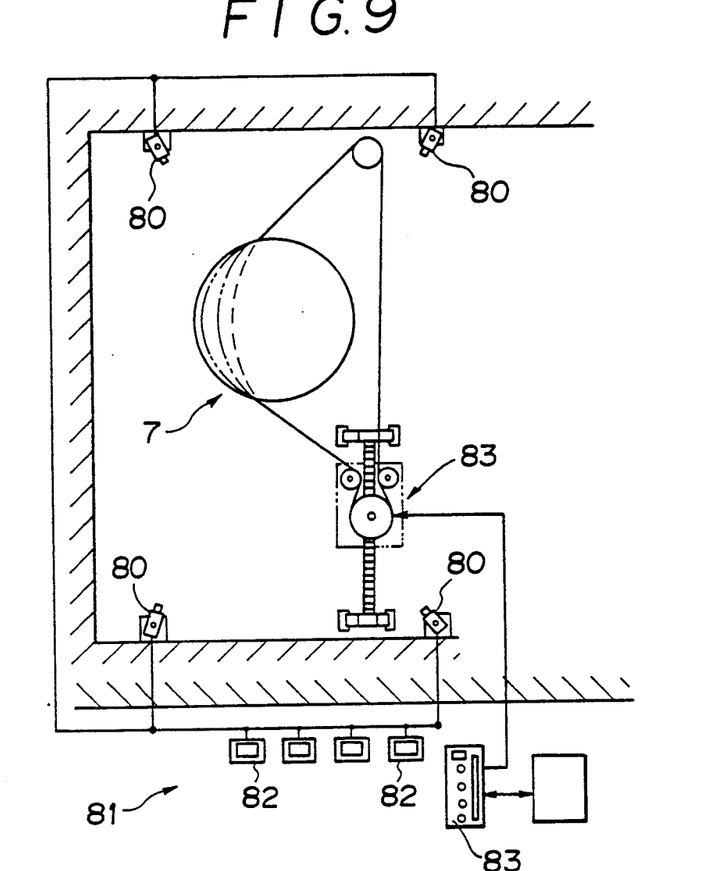
FIG. 9 is a plan view showing a monitor system at the time of cutting by the first means of the present invention.

The cutting operation described above is preferably carried out remotely in consideration of adverse influences of radioactivity on the human body. In this instance, video cameras 80 are disposed around the structure 7 inside the reactor to be cut as shown in FIG. 9, and the image of the structure 7 is monitored by a video monitor 82 disposed inside a remote control room 81. An operator operates an operation panel 83 and controls the operation of the driving device 83.

Incidentally, FIG. 9 shows an example where cutting is carried out by a single wire saw when cutting the structure 7 inside the reactor in the horizontal direction.

Wedges may be driven into the cutting groove in order to prevent the fall by gravity of the structure inside the reactor due to the expansion of the cutting groove during the cutting operation.

Figure 10:
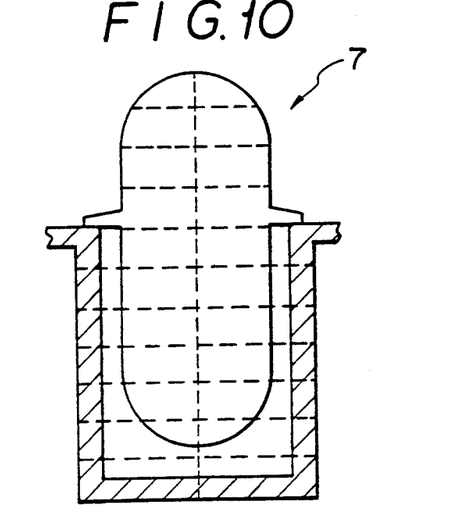
FIG. 10 is a sectional view of a structure inside a reactor which is cut by the first means of the present invention.

After the cutting operations are carried out in both the horizontal and vertical directions as described above, the structure 7 inside the reactor is cut into a large number of blocks as shown in FIG. 10. In each of the blocks, the appliances that particularly emit radioactivity are sealed by the grouting material. Therefore, the emission of radioactivity of each block is small, and the blocks are transported to the site of disposal by suitable transportation means, and are stored or processed.

An embodiment for accomplishing the second object of the present invention will be explained with reference to the drawings.

Figure 11:
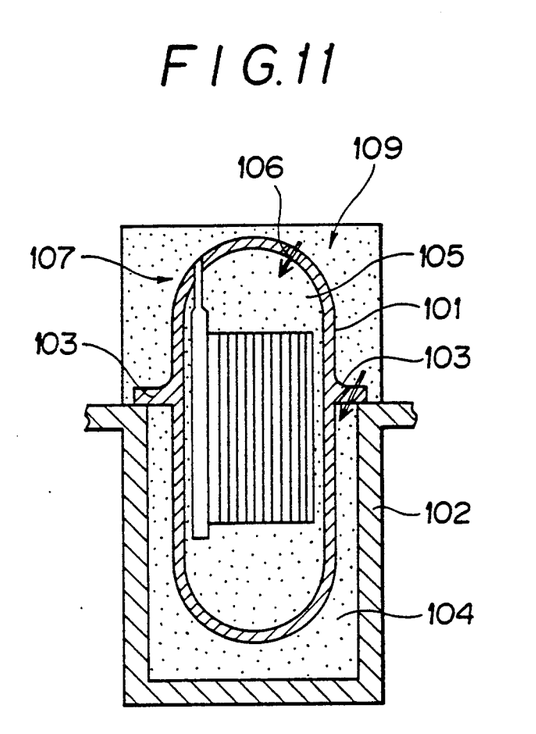
FIG. 11 is a sectional view showing the state where a grouting material is packed into internal structures of the reactor in the embodiment for accomplishing the second object, and the outer periphery of the reactor is covered with a concrete material.

As shown in FIG. 11, the pressure vessel 101 inside the nuclear reactor is supported at its jaw 103 by the concrete base 102 and to dismantle the reactor, a cement grouting material or a synthetic resin material 104 is pressure-fed through openings formed at the jaw 103 or from between the jaw 103 and the concrete base 102.

The cement grouting material comprises a cement and a mortar paste as the base material and a suitable amount of an admixture for accomplishing smooth packing and improving fluidity. A non-shrinkable material is suitable as this admixture.

Various synthetic resins, such as a polyester resin, a polyether resin, a polyacrylonitrile resin, a polyamide resin, a vinyl chloride resin, an epoxy resin, a melamine resin, a polyurethane resin, can be used as the synthetic resin material. An inorganic material consisting of calcium aluminate and calcium silicate as the principal components can also be employed.

An opening 106 is formed at the upper part of the pressure vessel 101, and a similar grouting material 105 or synthetic resin material is also packed through this opening 106. Furthermore, a framework is set up around the outer periphery of the upper part of the pressure vessel 101 and the concrete material is packed into the inside and solidified so as to form an outer peripheral concrete portion 109.

As a result, after the cement grouting material or the synthetic resin material and the concrete material are solidified, the inside of the pressure vessel 101 and its outer periphery and the inside of the concrete base 102, inclusive of various appliances such as pipings, are all integrated and solidified by the cement grouting material or the synthetic resin material, and their outer periphery is covered with the concrete portion and the concrete base.

Figure 12:
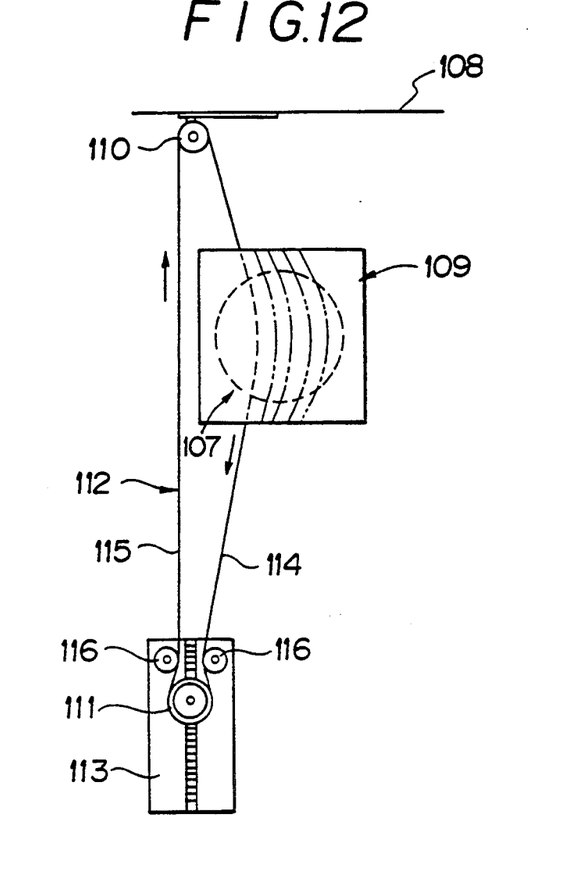
FIG. 12 is a plan view showing the horizontally cut state of the embodiment described above.
Figure 13:
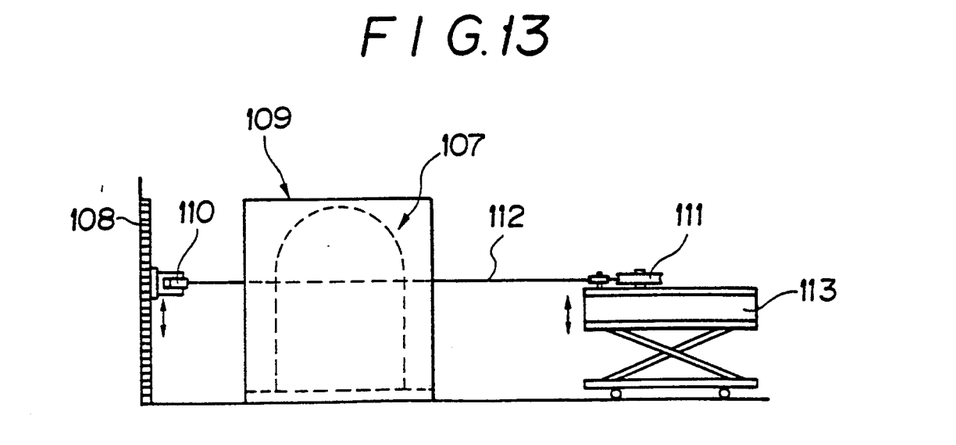
FIG. 13 is a front view showing the horizontally cut state of the embodiment described above.

When the reactor internal structure 107, which is thus integrated by the cement grouting material or the synthetic resin material and the concrete, is cut in the horizontal direction, an endless wire saw 112 is passed around a guide pulley 110 and a driving pulley 111 that are so fixed on a wall 108 as to be capable of adjusting their vertical positions as shown in FIGS. 12 and 13. The driving pulley 111 is fixed to a driving device 113 with a built-in driving motor, and the driving device 113 is fixed in such a manner that its height is adjustable.

The driving pulley 111 is fixed to the driving device 113 so that it can be move freely in the cutting direction of the material. Accordingly, when its fixed position is adjusted, the tension of the wire saw 112 can be kept substantially constant. A pull side 114 of the wire saw 112 is hooked on the reactor internal structure 107 while its feed side 115 is hooked directly on the guide pulley 110 through guide rollers 116, 116.

The wire saw 112 cuts integrally the concrete materials such as the austenitic stainless steel constituting the pressure vessel and to this end, diamond sintered beads or electrodeposition beads formed by baking diamond grains with powder such as cobalt bronze are used.

When the sintered beads are used in the present invention particularly for cutting the main body of the nuclear reactor made of the stainless steel, the concrete material is provided to the outer periphery of the main body of the reactor and for this reason, even when the surface of the cutting edge becomes flattened and its sharpness drops, the corners of the surface of the cutting edge which becomes flattened is cut away when the wire saw passes through the concrete material layer and cuts into the concrete material, so that a suitable cutting edge can be formed. In this way, the concrete material on the outer periphery of the reactor main body plays the role of the grinding stone for the sintered beads of the wire saw.

Figure 14:
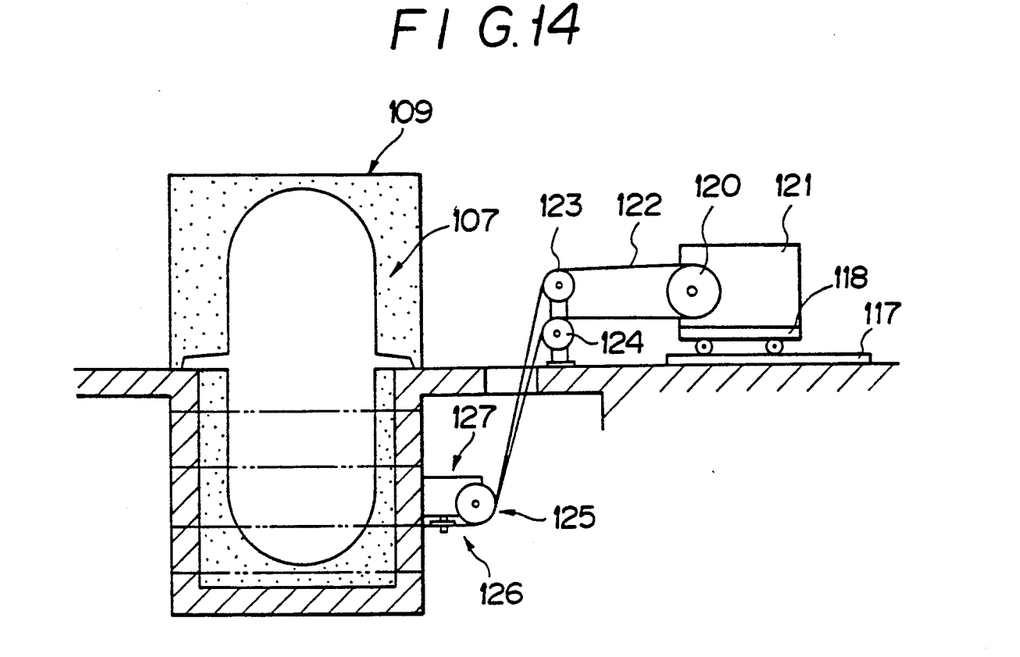
FIG. 14 is a side view showing another embodiment of horizontal cutting in the present invention.

When the horizontal plane of the driving device of the wire saw is different from that of the cut portion, a driving device 121 supporting a driving pulley 120 is disposed on a truck 118 on the surface of a foundation 117, a wire saw 122 passed around the driving pulley 120 is guided in a cutting horizontal direction by guide pulleys 123, 124, and the wire saw 122 is disposed drivably inside the horizontal plane by a vertical guide pulley 125 and a horizontal guide pulley 126 that are fixed to the reactor internal structure 107, etc, as shown in FIG. 14.

The truck 118 moves back in accordance with the cutting state so that the wire saw can maintain a predetermined tension. Cutting on an arbitrary horizontal plane becomes possible by fixing a pulley unit 127 consisting of the vertical guide pulley 125 and the horizontal pulley 126 to an arbitrary horizontal plane. A wedge may be implanted appropriately into the cut groove.

Figure 15:
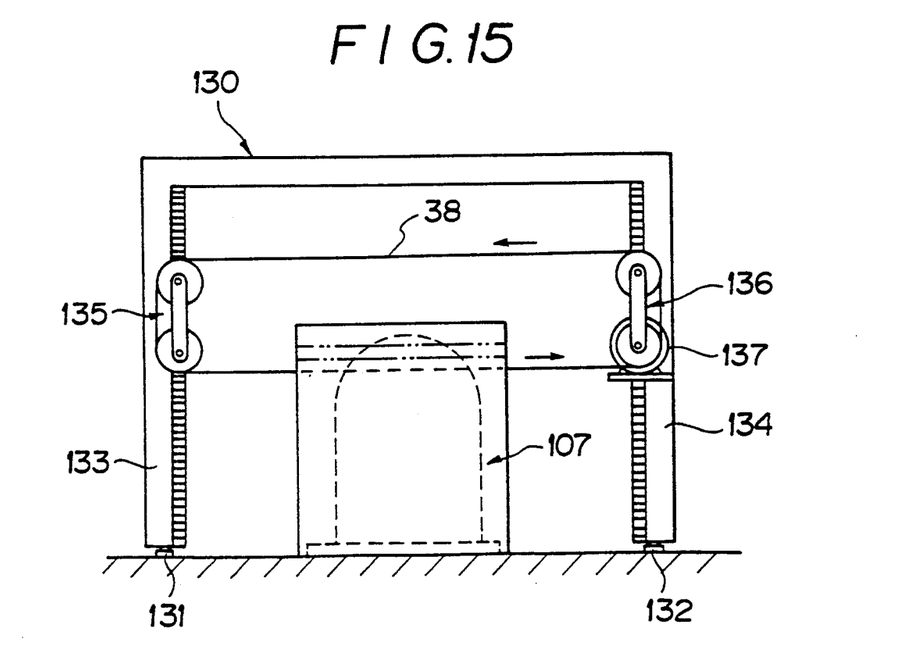
FIG. 15 is a front view showing an embodiment of vertical cutting by the second means of the present invention.

On the other hand, when the reactor internal structure is cut in the vertical direction, a gate-shaped frame 130 is movably disposed on rails 131, 132 in such a fashion as to surround the reactor internal structure 107 as shown in FIG. 15. A wire saw 138 is wound on each pulley of pulley units 135, 136 so disposed on support poles 133, 134 of the gate-shaped frame 130 as to be movable in the vertical direction, and while the wire saw 138 is being driven by a motor 137, the pulley units 135, 136 are lowered in match with the cutting state so as to carry out cutting in the vertical direction.

The top of the reactor main body is substantially spherical. Therefore, even when an operator attempts to start cutting of an arbitrary vertical section, it is very difficult to cut the section because the wire saw slips on the spherical surface. In accordance with the present invention, however, since the concrete material is provided to the outer periphery of the reactor main body, the concrete material can be easily cut when the wire saw is set to an arbitrary vertical section and then the cutting operation is started. When the wire saw reaches the reactor main body as cutting proceeds, the cut groove of the concrete material functions as a guide groove and the wire saw can cut the spherical surface of the reactor main body without slipping on the spherical surface.

Figure 16:
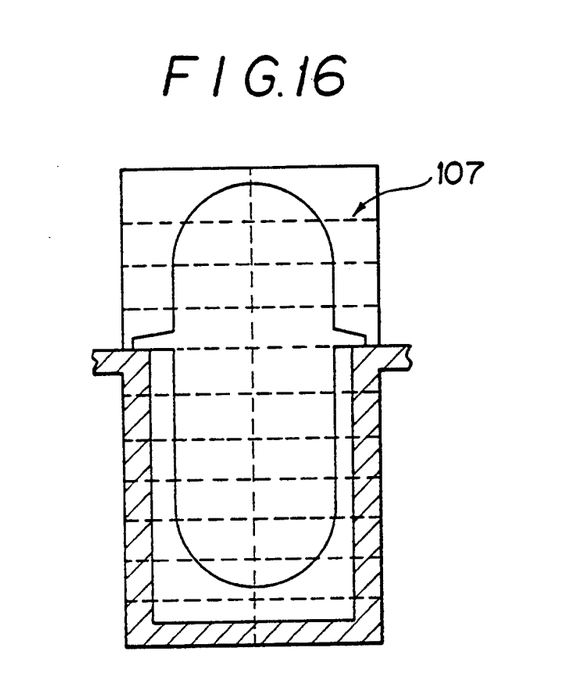
FIG. 16 is a sectional view of the internal structures of the reactor cut by the second means of the present invention.

When the cutting operation is carried out in both the horizontal and vertical directions as described above, the reactor internal structure 107 is cut into a large number of blocks as shown in FIG. 16. Since the appliances and the like emitting radioactivity are sealed by the concrete material and the grouting material in these blocks, emission of radioactivity of each of the blocks is less. Therefore, the blocks are transported to the site of disposal by suitable conveyor means, and are preserved or processed there. A new nuclear reactor can be set up at the site after removal of the old reactor.

When it is desired to shorten the time required for cutting and dismantling, and the cutting time or in other words, the execution time, due to the term of works, the overall term of works can be reduced to a half by plasma-cutting the metallic portions at the outer part of the reactor after the grouting material or the synthetic resin material is packed into the reactor, and then cutting the inside of the reactor with a wire saw.

The plasma-cutting method in such a case can use an oxidizing plasma such as oxygen plasma and air plasma, nitrogen plasma (inclusive of a water jet system which jets water to an operation gas), and a plasma consisting mainly of argon such as an argon-nitrogen plasma and an argon-hydrogen plasma.

The first object of the present invention is accomplished as described above. In other words, various internal and external members of the structure inside the reactor are all integrated and solidified by the grouting material, and each appliance does not move at the time of cutting, so that the cutting operation can be carried out stably. Since fragments and pieces do not scatter at the time of cutting of each appliance, contamination by radioactivity can be reduced. Since the appliances in the blocks are covered with the grouting material at the time of cutting, radioactivity emitted from each block is reduced and transportation of the blocks becomes safer.

The cutting operation can be carried out smoothly by the use of the wire saw having the diamond grains on the surface.

Since the preceding cutting edge and the cutting groove width adjustment cutting edge are used for the cutting operation, the cutting groove width which becomes smaller with the wear of the preceding cutting edge can be kept at a predetermined width by the cutting groove width adjustment cutting edge that follows. Accordingly, a new cutting edge can be inserted easily into the cutting groove and the cutting operation becomes smooth.

When the second object of the invention is accomplished in the way as described above, the wire saw first cuts the concrete material at the start of cutting of the structure. Therefore, the cutting operation can be started smoothly and the cut section becomes stable. As the cutting operation proceeds and the wire saw reaches the metal surface of the reactor main body, the cut groove of the concrete serves as the guide groove for the wire saw, so that the wire saw does not slip along the curved surface on the metal surface but can stably cut a predetermined position.

Even when the surface of the sintered material of the wire saw is worn out and flattened and its sharpness drops during cutting of the metallic reactor main body, the corners of the flattened cutting surface are cut off and the concrete material plays the role of the grinding stone when the wire saw cuts the metal surface of the reactor main body, which is equipped with the concrete material layer around the outer periphery of the metal surface, through the concrete layer. Accordingly, the wire saw can always maintain a stable cutting edge surface and can maintain also stable cuttability for a long period.

What is claimed is:

1. A method of cutting and removing a nuclear reactor, comprising the steps of:
   pressure-feeding a grouting material into a pressure vessel and to peripheral members outside said pressure vessel for integration thereof, and cutting said pressure vessel, with said pressure-fed grouting material therein, starting with the outer periphery of said pressure vessel, wherein said step of cutting includes the step of cutting with the use of a wire saw having diamond grains on the surface thereof.

2. A method of cutting and removing a nuclear reactor according to claim 1, wherein double cutting is carried out by the use of a preceding cutting edge and a cutting groove width adjustment cutting edge.

3. A method of cutting and removing a nuclear reactor, comprising the steps of:
   packing a cement grouting material or a synthetic resin material into said reactor;
   covering the outer periphery of said reactor with a concrete;
   cutting said reactor, with said material packed therein, into blocks starting with outer periphery thereof with a wire saw using diamond beads; and
   carrying out said blocks.

4. A method of cutting and removing a nuclear reactor, comprising the steps of:
   packing a cement grouting material or a synthetic resin material into said reactor;
   plasma-cutting the outer part of said reactor, with said material packed therein;
   cutting the inside of said reactor, with said material packed therein, with a wire saw using diamond beads into blocks; and
   carrying out said blocks.

5. A method of cutting and removing a nuclear reactor according to claim 1, wherein said step of pressure-feeding said grouting material includes the step of pressure-feeding said grouting material through at least one of an opening in an upper portion of said pressure vessel and an opening in a jaw portion of said pressure vessel.

6. A method of cutting and removing a nuclear reactor according to claim 1, wherein said grouting material is a non-shrinkable type material.

* * * * *